(12) United States Patent
Guan et al.

(10) Patent No.: US 12,293,644 B2
(45) Date of Patent: May 6, 2025

(54) CARD READER WITH A PROTECTIVE MECHANISM

(71) Applicant: Cheng Uei Precision Industry Co., LTD., New Taipei (TW)

(72) Inventors: Xiao-Xiang Guan, Dong-Guan (CN); Ming-Wei Lee, New Taipei (TW); Jin-Huai Mo, Dong-Guan (CN); Wei-Jian Wen, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/646,697

(22) Filed: Apr. 25, 2024

(65) Prior Publication Data

US 2025/0111729 A1    Apr. 3, 2025

(30) Foreign Application Priority Data

Sep. 28, 2023   (CN) .......................... 202322669555.2

(51) Int. Cl.
    *G07F 7/08* (2006.01)
(52) U.S. Cl.
    CPC ................................. *G07F 7/0873* (2013.01)
(58) Field of Classification Search
    CPC .. G07F 7/0873; G06K 7/0004; G06K 7/0021; G06K 7/0095; G06K 7/089; G06K 7/10881
    See application file for complete search history.

(56) References Cited

U.S. PATENT DOCUMENTS

| 6,561,421 | B1 * | 5/2003 | Yu ........................ | G06K 7/0008 |
|---|---|---|---|---|
|  |  |  |  | 345/163 |
| 2014/0166747 | A1 * | 6/2014 | Wormsley .............. | G06K 7/082 |
|  |  |  |  | 235/449 |
| 2020/0050803 | A1 * | 2/2020 | Mochida ............. | G06K 7/0095 |
| 2023/0177513 | A1 * | 6/2023 | Townsend ............ | G07F 7/0873 |
|  |  |  |  | 705/44 |

FOREIGN PATENT DOCUMENTS

| CA | 2499917 C | * | 1/2017 | .............. A63F 1/00 |
| CN | 218828095 U |  | 4/2023 | |

OTHER PUBLICATIONS

Cards and card readers for voucher and access control systems (Year: 1980).*

* cited by examiner

*Primary Examiner* — Thien T Mai
(74) *Attorney, Agent, or Firm* — Cheng-Ju Chiang

(57) ABSTRACT

A card reader with a protective mechanism includes an upper shell, a lower shell, a protective mechanism and a circuit board assembly. An upper portion of a front end of the upper shell slantwise extends downward and rearward, and then is bent rearward to form an upper extending portion. A lower portion of the front end of the upper shell extends rearward to form a lower extending portion. The upper extending portion is spaced from the lower extending portion to form an inserting passageway between the upper extending portion and the lower extending portion. The lower shell is mounted to a bottom surface of the upper shell. The protective mechanism is disposed between the upper shell and the lower shell. The circuit board assembly is disposed between the upper shell and the lower shell.

14 Claims, 12 Drawing Sheets

CARD READER WITH A PROTECTIVE MECHANISM

CROSS-REFERENCE TO RELATED APPLICATION

The present application is based on, and claims priority from, China Patent Application No. 202322669555.2, filed Sep. 28, 2023, the disclosure of which is hereby incorporated by reference herein in its entirety.

BACKGROUND OF THE INVENTION

Field of the Invention

The present invention generally relates to a card reader, and more particularly to a card reader with a protective mechanism which is able to increase a usage life, conveniently replace a protective mechanism and prevent extraneous materials from invading into the card reader with the protective mechanism.

Description of the Prior Art

Generally, a conventional card reader has a larger inserting slot, so that extraneous materials including dusts, liquids or chippings are easily to enter an inside of the conventional card reader from the inserting slot. When the extraneous materials invade an electronic component of the conventional card reader or a circuit board of the conventional card reader, the electronic component of the conventional card reader or the circuit board of the conventional card reader will be broken.

A conventional POS (Point of Sale) machine is usually equipped with the conventional card reader. The conventional POS (Point of Sale) machine includes a base body. The base body has a shell, an IC (Integrated Circuit) card holder disposed in the shell, and an electronic component disposed in the shell. The shell has a first inserting slot. The IC card holder has a second inserting slot. The first inserting slot is corresponding to the second inserting slot. A sealing element is disposed between the first inserting slot and the second inserting slot. The first inserting slot is blocked by the sealing element. The sealing element has an upper sealing part and a lower sealing part. The upper sealing part and the lower sealing part are flexible and deformable, and the upper sealing part and the lower sealing part are able to recover automatically. The upper sealing part abuts against the lower sealing part. When a card is inserted into the base body from the first inserting slot, the card abuts against the upper sealing part and the lower sealing part, the upper sealing part and the lower sealing part are separated to form a third inserting slot. The third inserting slot of the sealing element is corresponding to the second inserting slot of the IC card holder. The card passes through the third inserting slot, and then the card passes through the second inserting slot. When the card is pulled out, the upper sealing part and the lower sealing part recover automatically, and the upper sealing part and the lower sealing part abut against each other.

However, the upper sealing part and the lower sealing part are disposed to an inner wall of a front shell of the shell, after the upper sealing part and the lower sealing part are used for a long time, the upper sealing part and the lower sealing part are deformed, and the upper sealing part and the lower sealing part are difficultly changed. In addition, the electronic component of the conventional POS machine is disposed adjacent to the third inserting slot between the upper sealing part and the lower sealing part, and the second inserting slot is adjacent to the third inserting slot, after the card passes through the third inserting slot of the sealing element, the card passes through a shorter route to be inserted to the second inserting slot of the IC card holder, consequently, the card and the sealing element easily collide with the electronic component to cause a damage of the card. As a result, the conventional POS machine reduces a usage life.

Thus, it is essential to provide an innovative card reader with a protective mechanism. The innovative card reader with the protective mechanism is able to increase a usage life, conveniently replace a protective mechanism and prevent extraneous materials from invading into the card reader with the protective mechanism.

BRIEF SUMMARY OF THE INVENTION

An object of the present invention is to provide a card reader with a protective mechanism which is able to increase a usage life, conveniently change a protective mechanism and prevent extraneous materials invading into the card reader with the protective mechanism. The card reader with the protective mechanism includes an upper shell, a lower shell, a protective mechanism and a circuit board assembly. An upper portion of a front end of the upper shell slantwise extends downward and rearward, and then is bent rearward to form an upper extending portion. A lower portion of the front end of the upper shell extends rearward to form a lower extending portion. The upper extending portion is spaced from the lower extending portion to form an inserting passageway between the upper extending portion and the lower extending portion. An outer portion of a rear end of the upper extending portion slantwise extends inward and rearward to form a first chamfer. An outer portion of a rear end of the lower extending portion slantwise extends inward and rearward to form a second chamfer. A bottom of the upper shell is opened freely. The lower shell is mounted to a bottom surface of the upper shell to form an accommodating space between the upper shell and the lower shell. The protective mechanism is disposed between the upper shell and the lower shell, and the protective mechanism is accommodated in the accommodating space. The protective mechanism has a protective shell and a dustproof sheet. The dustproof sheet is disposed in the protective shell. The dustproof sheet has an upper dustproof sheet, and a lower dustproof sheet located under the upper dustproof sheet. The protective shell has a top wall, a bottom wall and an isolating wall. The top wall is opposite to the bottom wall. The isolating wall is connected between two middles of two inner surfaces of the top wall and the bottom wall. The protective shell has an inserting slot penetrating through a middle of the isolating wall, a front surface and a rear surface of the protective shell along a longitudinal direction. The inserting slot transversely extends in the middle of the isolating wall. The inserting passageway of the upper shell is communicated with the inserting slot. A front end of the protective shell defines an inserting end penetrating through the front surface of the protective shell. A rear end of the protective shell defines an outlet end penetrating through the rear surface of the protective shell. The dustproof sheet is disposed in the outlet end. The rear ends of the upper extending portion and the lower extending portion are inserted into the inserting end of the protective shell. The upper extending portion abuts against an upper portion of an inner surface of the inserting end. The upper extending portion abuts against a front surface of the isolating wall and the inner surface of the top wall. The lower extending portion abuts against a lower portion of the inner surface of the inserting end. The lower extending portion abuts against the front surface of the isolating wall and the inner surface of the bottom wall. An inner portion of the front end of the protective shell slantwise extends inward and rearward to form a third chamfer. The third chamfer of the protective shell is corresponding to the first chamfer and the second chamfer of the upper shell. The circuit board assembly is disposed between the upper shell and the lower shell, and the circuit board assembly is accommodated in the accommodating space. The protective mechanism is disposed to a front end of the circuit board assembly. The circuit board assembly has a clamping slot penetrating through a front of a middle of the circuit board assembly. The clamping slot is corresponding to the outlet end of the protective mechanism along the longitudinal direction. The clamping slot is corresponding to the inserting passageway and the inserting slot along the longitudinal direction. When a card is inserted into the inserting passageway and the inserting slot, the card abuts against the upper dustproof sheet and the lower dustproof sheet, the upper dustproof sheet is separated from the lower dustproof sheet to form an insertion space between the upper dustproof sheet and the lower dustproof sheet, the clamping slot is corresponding to the insertion space along the longitudinal direction, the clamping slot is communicated with the outlet end, the insertion space, the inserting slot and the inserting passageway.

Another object of the present invention is to provide a card reader with a protective mechanism. The card reader with the protective mechanism includes an upper shell, a lower shell, a protective mechanism and a circuit board assembly. An upper portion of a front end of the upper shell slantwise extends rearward to form an upper extending portion. A lower portion of the front end of the upper shell extends rearward to form a lower extending portion. The upper extending portion is spaced from the lower extending portion to form an inserting passageway. A bottom of the upper shell is opened freely. The lower shell is mounted to a bottom surface of the upper shell to form an accommodating space between the upper shell and the lower shell. The protective mechanism is disposed between the upper shell and the lower shell, and the protective mechanism is accommodated in the accommodating space. The protective mechanism has a protective shell and a dustproof sheet. The dustproof sheet is disposed in the protective shell. The dustproof sheet has an upper dustproof sheet, and a lower dustproof sheet located under the upper dustproof sheet. The protective shell has a top wall, a bottom wall and an isolating wall. The top wall is opposite to the bottom wall. The isolating wall is connected between two middles of two inner surfaces of the top wall and the bottom wall. The protective shell has an inserting slot penetrating through the isolating wall, a front surface and a rear surface of the protective shell along a longitudinal direction. The inserting passageway of the upper shell is communicated with the inserting slot. A front end of the protective shell defines an inserting end penetrating through the front surface of the protective shell. A rear end of the protective shell defines an outlet end penetrating through the rear surface of the protective shell. The dustproof sheet is disposed in the outlet end. Rear ends of the upper extending portion and the lower extending portion are inserted into the inserting end of the protective shell. The upper extending portion abuts against an upper portion of an inner surface of the inserting end. The lower extending portion abuts against a lower portion of the inner surface of the inserting end. The circuit board assembly is accommodated in the accommodating space. The protective mechanism is disposed to a front end of the circuit board assembly. The circuit board assembly has a clamping slot penetrating through a front of a middle of the circuit board assembly.

Another object of the present invention is to provide a card reader with a protective mechanism. The card reader with the protective mechanism includes an upper shell, a lower shell, a protective mechanism and a circuit board assembly. An upper portion of a front end of the upper shell slantwise extends rearward to form an upper extending portion. A lower portion of the front end of the upper shell extends rearward to form a lower extending portion. The upper extending portion is spaced from the lower extending portion to form an inserting passageway. A bottom of the upper shell is opened freely. The lower shell is mounted to a bottom surface of the upper shell to form an accommodating space between the upper shell and the lower shell. The lower shell has a base board. A top surface of the base board extends upward to form a first supporting portion and a second supporting portion positioned behind the first supporting portion. A first mounting portion is defined between the first supporting portion and the second supporting portion. The first supporting portion supports the lower extending portion of the upper shell. The protective mechanism is accommodated in the accommodating space. The protective mechanism has a protective shell and a dustproof sheet. The protective shell has a top wall, a bottom wall and an isolating wall. The isolating wall is connected between two middles of two inner surfaces of the top wall and the bottom wall. The protective shell has an inserting slot penetrating through the isolating wall, a front surface and a rear surface of the protective shell. The inserting passageway of the upper shell is communicated with the inserting slot. A front end of the protective shell defines an inserting end penetrating through the front surface of the protective shell. A rear end of the protective shell defines an outlet end penetrating through the rear surface of the protective shell. The rear ends of the upper extending portion and the lower extending portion are inserted into the inserting end of the protective shell. The upper extending portion abuts against a front surface of the isolating wall and the inner surface of the top wall. The lower extending portion abuts against the front surface of the isolating wall and the inner surface of the bottom wall. The circuit board assembly is accommodated in the accommodating space. The protective mechanism is disposed to a front end of the circuit board assembly. The circuit board assembly has a clamping slot communicated with the outlet end of the protective shell. The protective shell is positioned in the first mounting portion, the circuit board assembly is mounted to the second supporting portion.

As described above, the card reader with the protective mechanism is conveniently maintained by removing the lower shell to replace the dustproof sheet, the rear ends of the upper extending portion and the lower extending portion of the upper shell are surrounded by the protective shell, the inserting passageway of the upper shell and the inserting slot are fastened to the protective shell to make the inserting passageway and the inserting slot have fastened positions, so an insertion position deviation of the card is prevented to prevent the card reader with the protective mechanism from colliding with the card. Furthermore, the protective mechanism is disposed to the front end of the circuit board assembly to make the circuit board assembly be away from the insertion space of the dustproof sheet which is disposed in the protective shell, after the card passes through the insertion space of the dustproof sheet, the card passes through a longer route to be inserted to the clamping slot by the protective shell, and the protective shell blocks an electronic component of the circuit board assembly from contacting the card, consequently, the card and the dustproof sheet hardly collide with the electronic component to cause a damage of the card. In addition, the third chamfer prevents the protective shell colliding with the upper extending portion and the lower extending portion of the upper shell, and the upper dustproof sheet and the lower dustproof sheet clean dusts or liquids of the card. As a result, the card reader with the protective mechanism is able to increase a usage life of the card reader with the protective mechanism, conveniently replace the protective mechanism and prevent extraneous materials from invading into the card reader with the protective mechanism.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
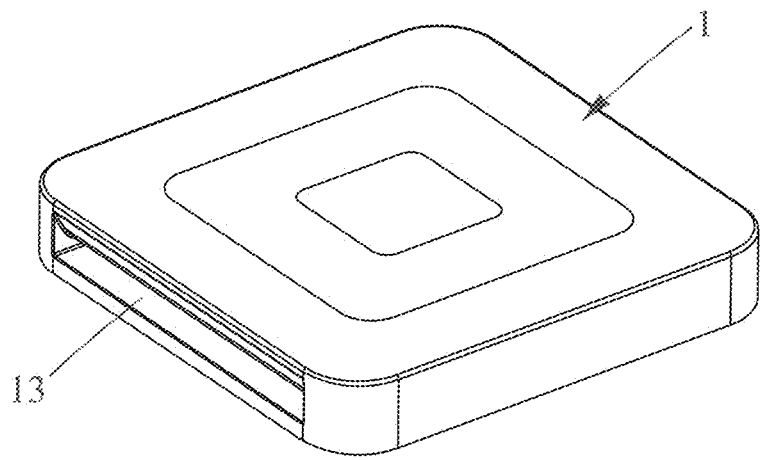
FIG. 1 is a perspective view of a card reader with a protective mechanism according to a preferred embodiment of the present invention.
Figure 2:
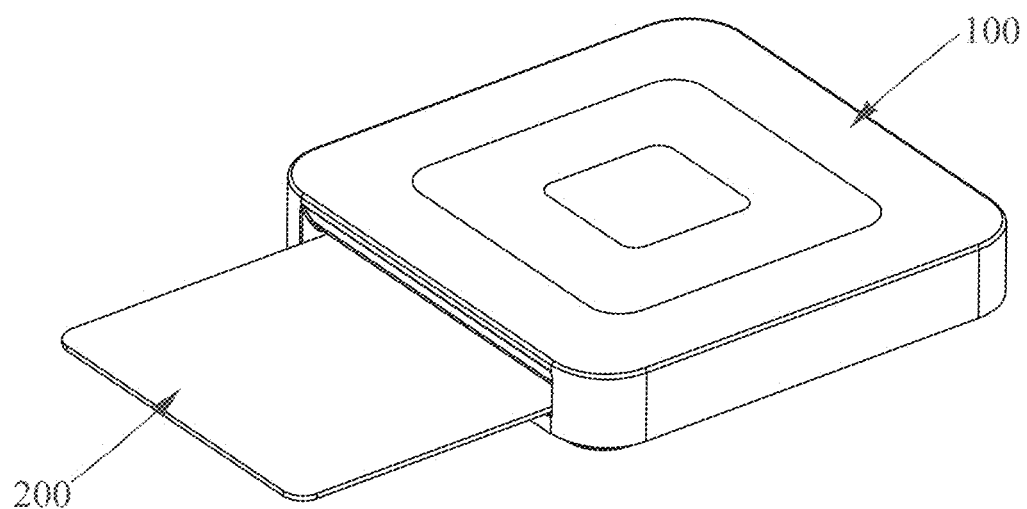
FIG. 2 is another perspective view of the card reader with the protective mechanism of FIG. 1, wherein a card is inserting into the card reader with the protective mechanism.
Figure 3:
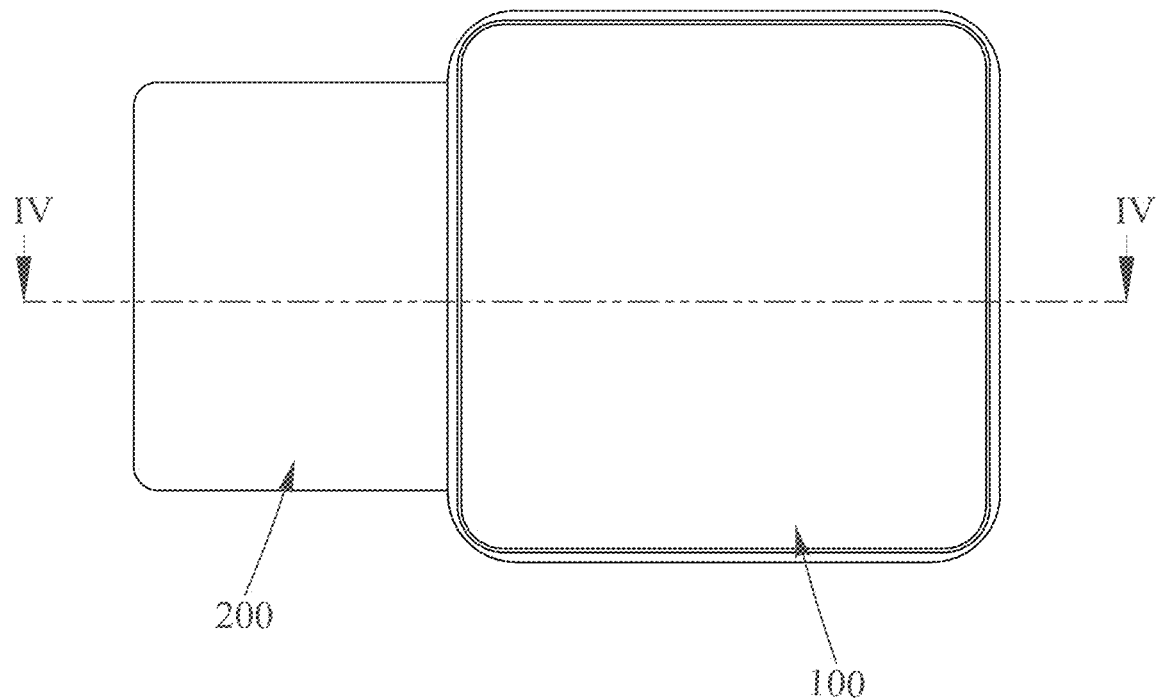
FIG. 3 is a diagrammatic drawing of the card reader with the protective mechanism, wherein the card is inserting into the card reader with the protective mechanism.
Figure 4:
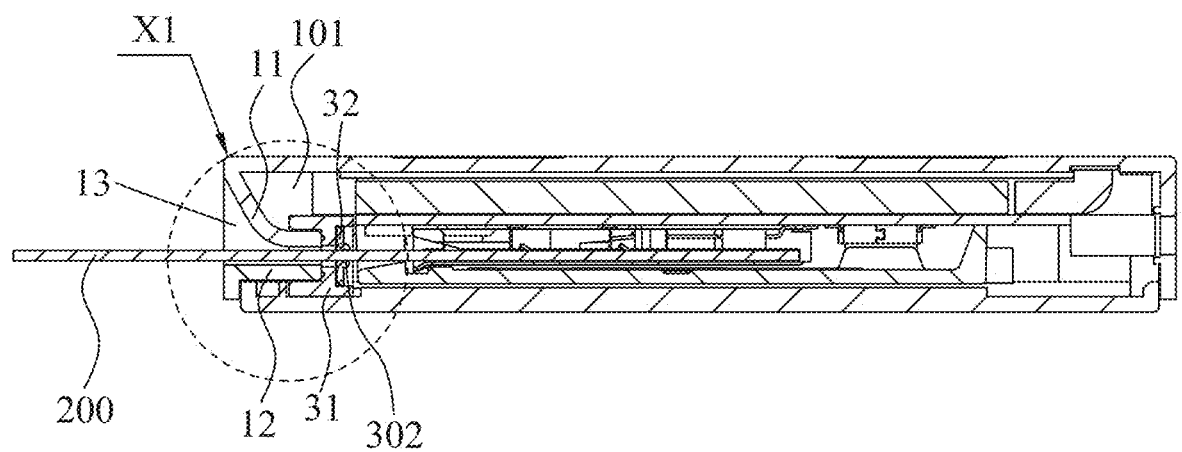
FIG. 4 is a sectional diagram of the card reader with the protective mechanism along a line IV-IV of FIG. 3.
Figure 5:
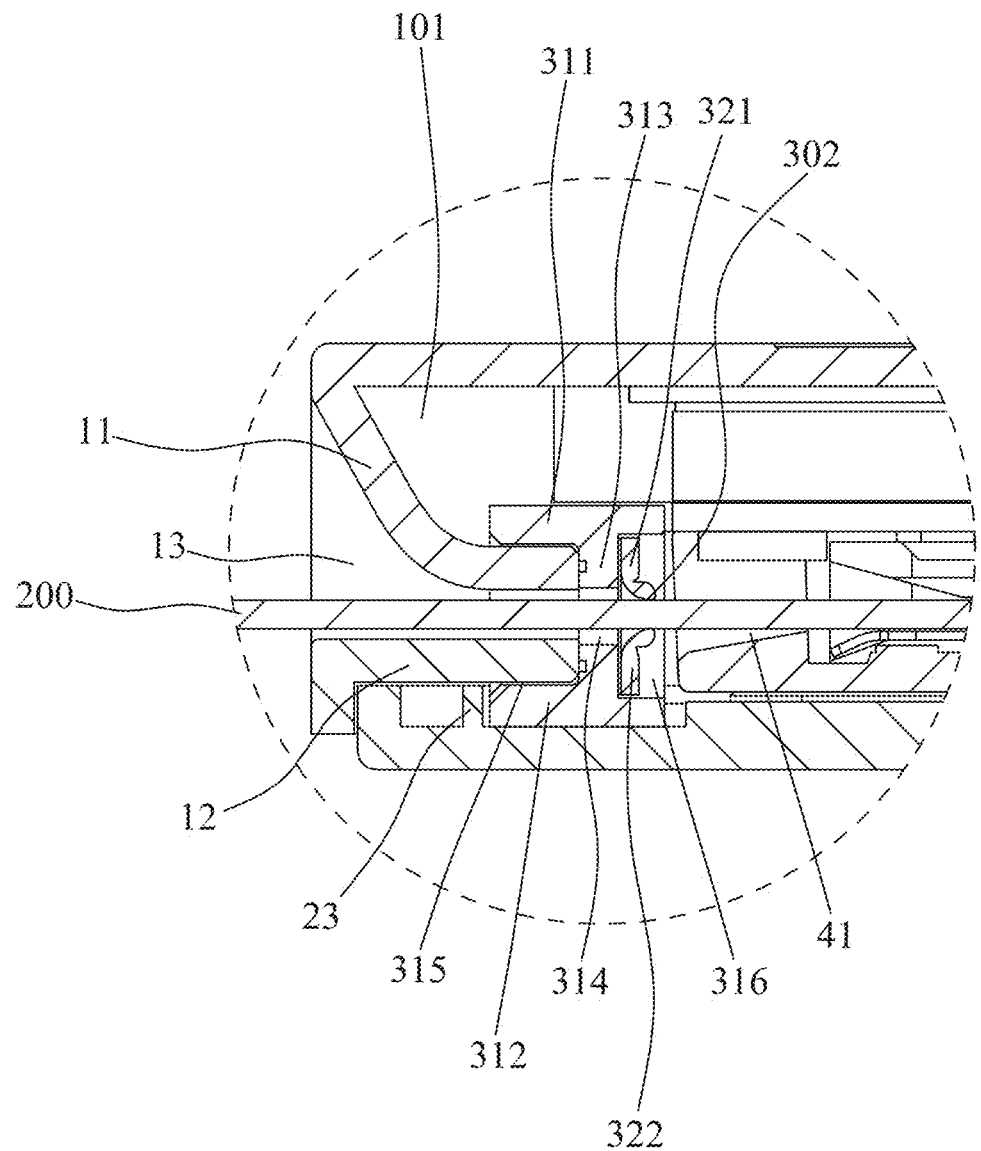
FIG. 5 is an enlarged view of an encircled portion X1 of the card reader with the protective mechanism of FIG. 4.
Figure 6:
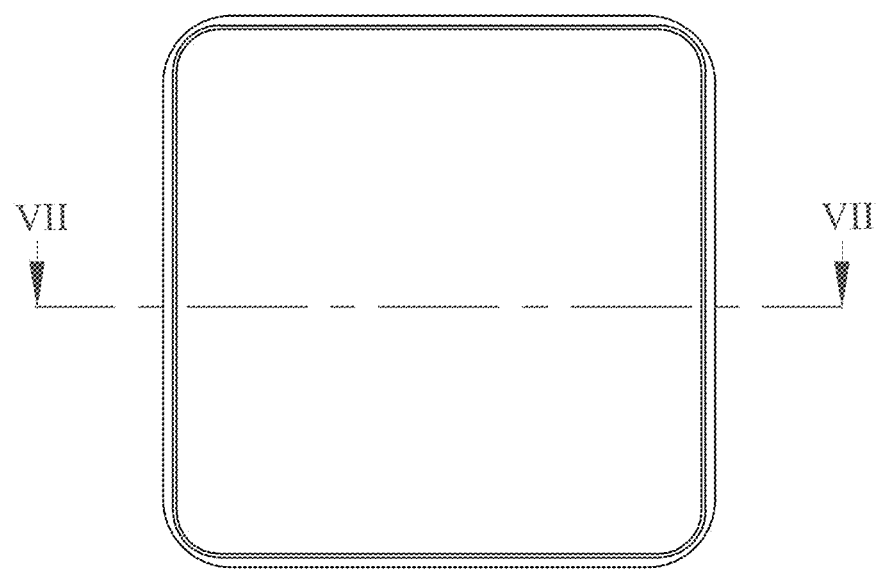
FIG. 6 is another diagrammatic drawing of the card reader with the protective mechanism, wherein the card is drawn out from the card reader with the protective mechanism.
Figure 7:
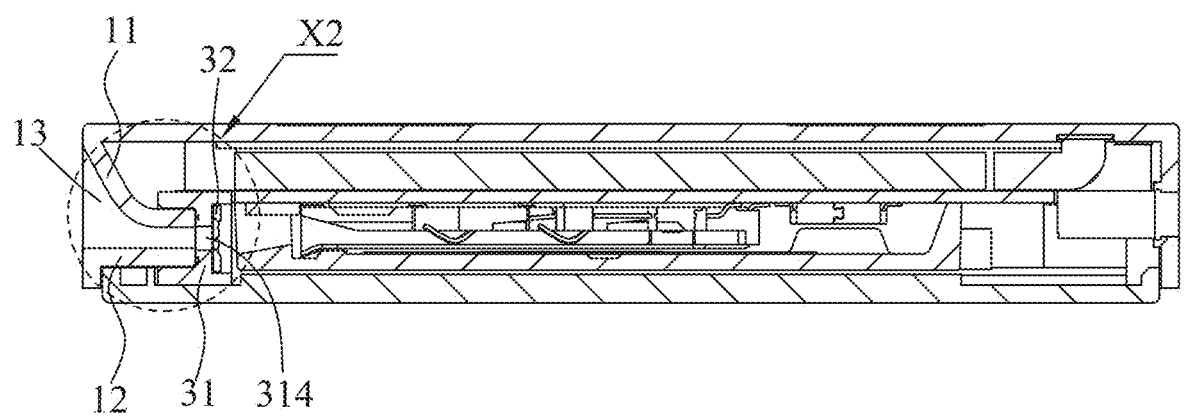
FIG. 7 is a sectional diagram of the card reader with the protective mechanism along a line VII-VII of FIG. 6.
Figure 8:
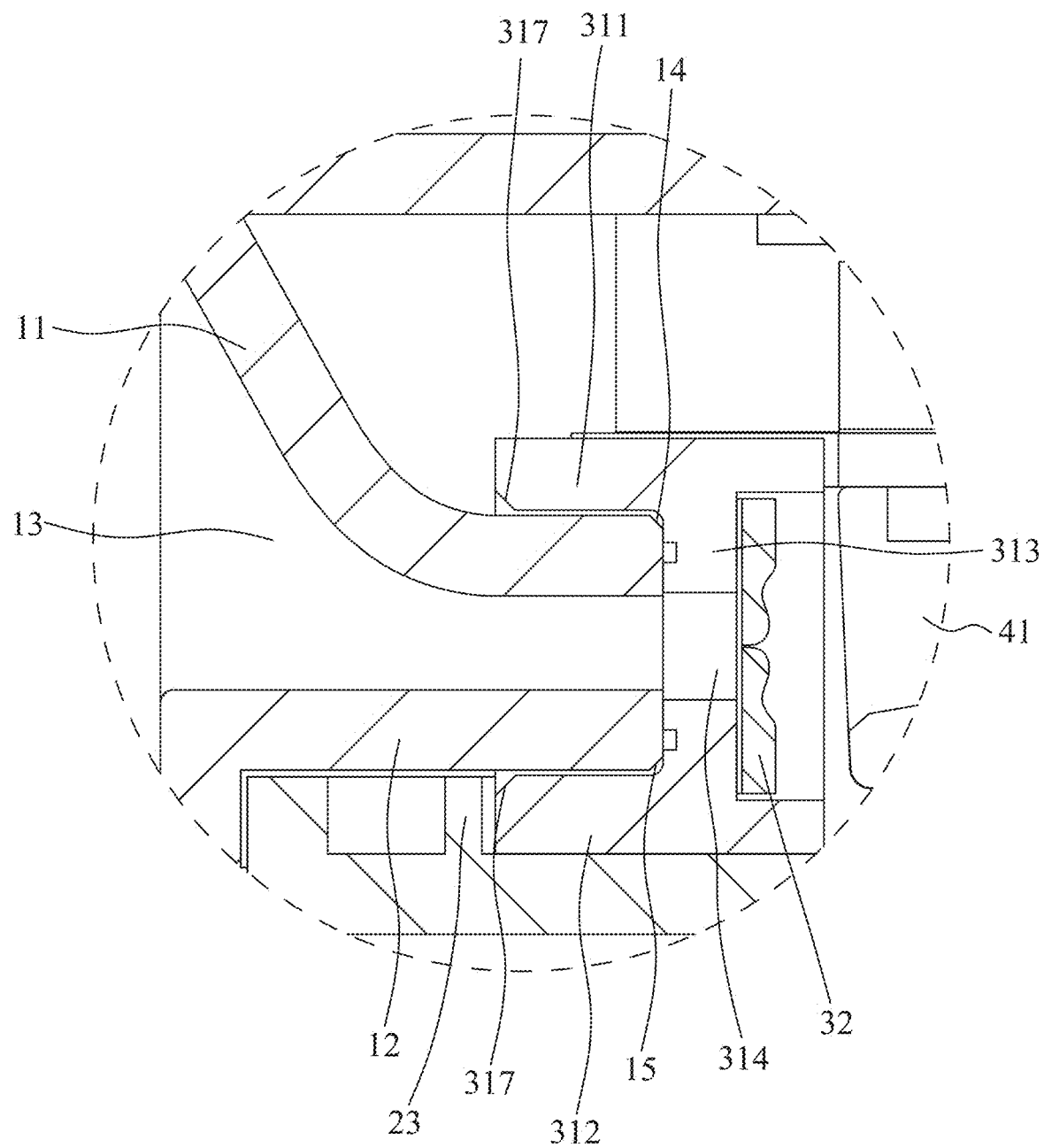
FIG. 8 is an enlarged view of an encircled portion X2 of the card reader with the protective mechanism of FIG. 7.

With reference to FIG. 1 to FIG. 9, a card reader with a protective mechanism 100 according to a preferred embodiment of the present invention is shown. The card reader with the protective mechanism 100 includes an upper shell 1, a lower shell 2, a protective mechanism 3 and a circuit board assembly 4.

The upper shell 1 is shown as a cuboid shape. The upper shell 1 is hollow. A bottom of the upper shell 1 is opened freely. The lower shell 2 is mounted to a bottom surface of the upper shell 1 to form an accommodating space 101 between the upper shell 1 and the lower shell 2. The protective mechanism 3 is disposed between the upper shell 1 and the lower shell 2, and the protective mechanism 3 is accommodated in the accommodating space 101. The circuit board assembly 4 is disposed between the upper shell 1 and the lower shell 2, and the circuit board assembly 4 is accommodated in the accommodating space 101. The protective mechanism 3 is disposed to a front end of the circuit board assembly 4. A card 200 is inserted into the circuit board assembly 4 from the upper shell 1 and the protective mechanism 3.

Referring to FIG. 1 to FIG. 12, a front end of the upper shell 1 includes an upper extending portion 11, a lower extending portion 12 and an inserting passageway 13. An upper portion of the front end of the upper shell 1 slantwise extends downward and rearward, and then is bent rearward to form the upper extending portion 11. The upper extending portion 11 abuts against an upper corresponding mechanism of the protective mechanism 3 to realize that the upper shell 1 is located to the protective mechanism 3, and the upper shell 1 is fastened to the protective mechanism 3. A lower portion of the front end of the upper shell 1 extends rearward to form the lower extending portion 12. The upper extending portion 11 and the lower extending portion 12 project into the accommodating space 101 of the upper shell 1. The lower extending portion 12 abuts against a lower corresponding mechanism of the protective mechanism 3 to realize that the upper shell 1 is located to the protective mechanism 3, and the upper shell 1 is fastened to the protective mechanism 3. Several portions of an inner peripheral surface of the upper shell 1 are recessed opposite to the circuit board assembly 4 to form a plurality of buckling grooves 102.

The upper extending portion 11 is spaced from the lower extending portion 12 to form the inserting passageway 13 between the upper extending portion 11 and the lower extending portion 12. The inserting passageway 13 is corresponding to a middle corresponding mechanism of the protective mechanism 3. Two sides of the upper extending portion 11 are bent downward, and two sides of the lower extending portion 12 are bent upward. The two sides of the upper extending portion 11 are connected with the two sides of the lower extending portion 12, respectively. Two outer surfaces of the two sides of the upper extending portion 11 are smoothly connected with two outer surfaces of the two sides of the lower extending portion 12. Two inner surfaces of the two sides of the upper extending portion 11 are smoothly connected with two inner surfaces of the two sides of the lower extending portion 12.

An outer portion of a rear end of the upper extending portion 11 slantwise extends inward and rearward to form a first chamfer 14. The first chamfer 14 prevents the upper portion of the rear end of the upper extending portion 11 from colliding with the protective mechanism 3, and a damage of the upper portion of the rear end of the upper extending portion 11 and the protective mechanism 3 is accordingly prevented. An outer portion of a rear end of the lower extending portion 12 slantwise extends inward and rearward to form a second chamfer 15. The second chamfer 15 prevents the lower portion of the rear end of the lower extending portion 12 from colliding with the protective mechanism 3, and a damage of the lower portion of the rear end of the lower extending portion 12 and the protective mechanism 3 is accordingly prevented.

Figure 9:
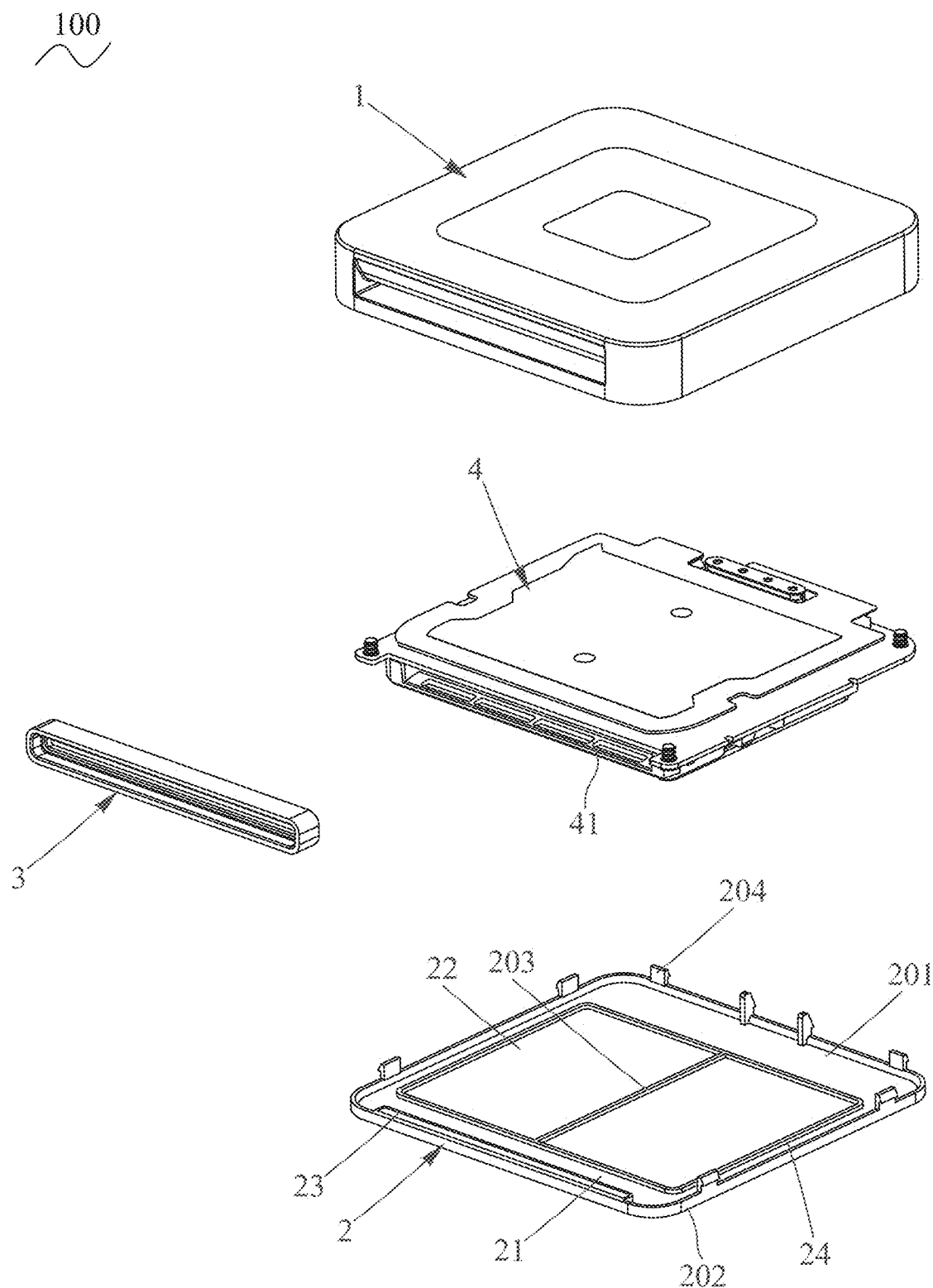
FIG. 9 is an exploded view of the card reader with the protective mechanism according to the preferred embodiment of the present invention.
Figure 12:
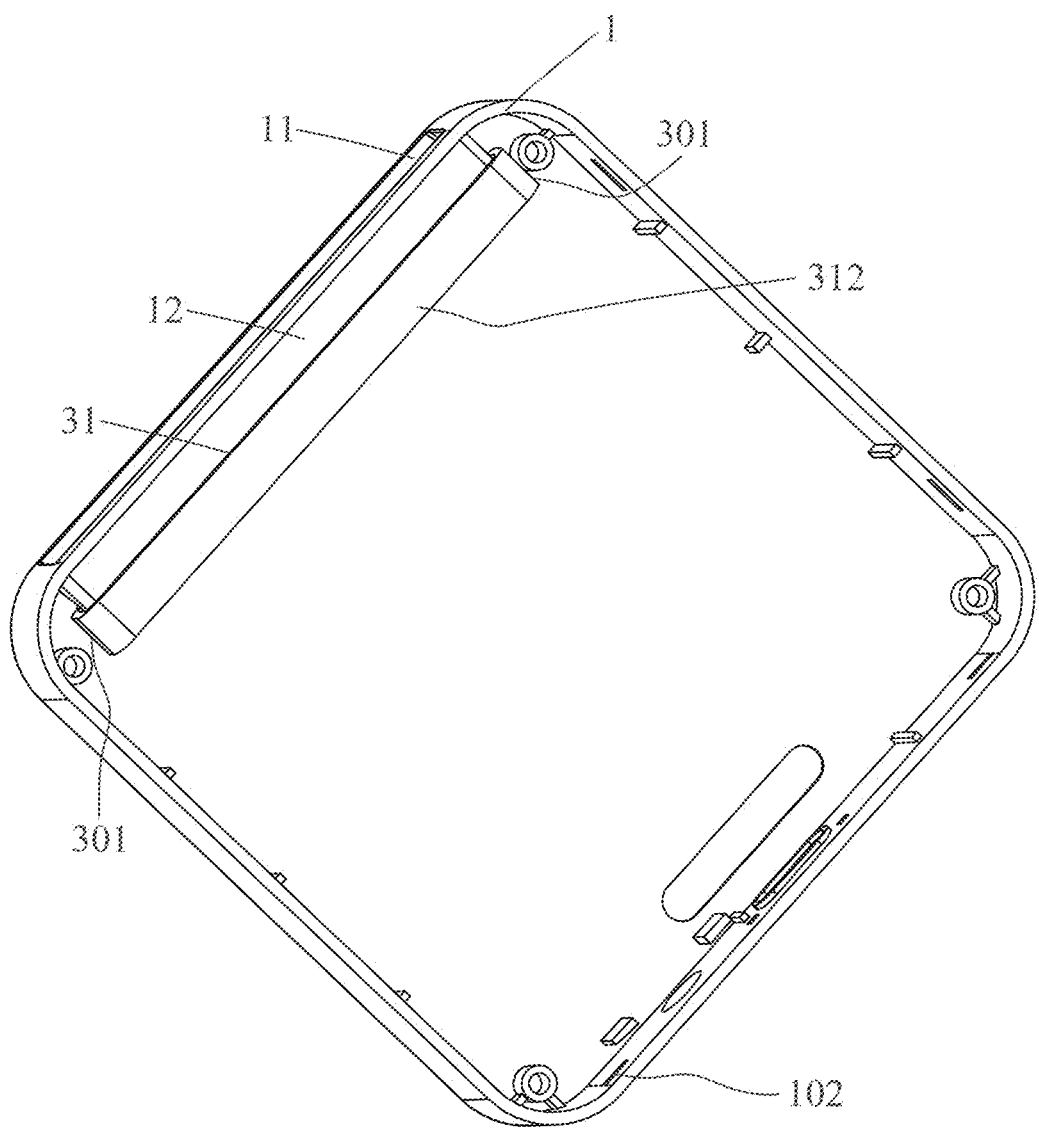
FIG. 12 is a partially assembling view of the card reader with the protective mechanism according to the preferred embodiment of the present invention.

Referring to FIG. 1, FIG. 9 and FIG. 12, the lower shell 2 and the upper shell 1 are rectangular, and the lower shell 2 is assembled to the bottom surface of the upper shell 1 to form a rectangular shape. The lower shell 2 has a first mounting portion 21, a second mounting portion 22, a first supporting portion 23 and a second supporting portion 24. The lower shell 2 has a base board 201, and a peripheral wall 202 protruded upward from a periphery of the base board 201. A front end of a top surface of the base board 201 of the lower shell 2 extends upward to form the first supporting portion 23. The first supporting portion 23 is shown as a U shape. A mouth of the first supporting portion 23 faces an inner surface of a front of the peripheral wall 202 of the lower shell 2. Two free ends of the first supporting portion 23 are connected with the inner surface of the front of the peripheral wall 202 of the lower shell 2. Several portions of a top of the peripheral wall 202 protrude upward to form a plurality of buckling blocks 204. When the lower shell 2 is assembled to the bottom surface of the upper shell 1, the plurality of the buckling blocks 204 are buckled in the plurality of the buckling grooves 102 to fasten the lower shell 2 to the upper shell 1.

A middle of the top surface of the base board 201 of the lower shell 2 extends upward to form the second supporting portion 24. The second supporting portion 24 is a rectangle frame. A rear surface of the first supporting portion 23 is separated from a front surface of the second supporting portion 24. The first mounting portion 21 is formed between the rear surface of the first supporting portion 23 and the front surface of the second supporting portion 24. The second supporting portion 24 is hollow to define the second mounting portion 22 inside the second supporting portion 24. A middle of a front of the second supporting portion 24 is connected with a middle of a rear of the second supporting portion 24 by an isolating rib 203. The isolating rib 203 is disposed in a middle of the second mounting portion 22.

The first mounting portion 21 is corresponding to the protective mechanism 3. The protective mechanism 3 is fastened in the first mounting portion 21 to realize that the protective mechanism 3 is located in the lower shell 2, and the protective mechanism 3 is fixed in the lower shell 2. The second mounting portion 22 is corresponding to the circuit board assembly 4. The circuit board assembly 4 is disposed in the second mounting portion 22 to realize that the circuit board assembly 4 is located to the lower shell 2, and the circuit board assembly 4 is fixed to the lower shell 2. The first supporting portion 23 is disposed under the lower extending portion 12 of the upper shell 1.

The first supporting portion 23 is used for locating the lower extending portion 12 of the upper shell 1, and the first supporting portion 23 is used for supporting the lower extending portion 12 of the upper shell 1. The circuit board assembly 4 is mounted to the second supporting portion 24. The second supporting portion 24 is disposed under the circuit board assembly 4. A top of the circuit board assembly 4 is located to a top of the second supporting portion 24, and a bottom of the circuit board assembly 4 is received inside the second supporting portion 24. An electronic element (not labeled) of the bottom of the circuit board assembly 4 is received in the second mounting portion 22. An electronic component (not labeled) of the circuit board assembly 4 is accommodated in the accommodating space 101. The second supporting portion 24 is used for locating the circuit board assembly 4, and the second supporting portion 24 is used for supporting the circuit board assembly 4. In the preferred embodiment, the lower shell 2 is detachable from the upper shell 1 of the card reader with the protective mechanism 100 to conveniently replace corresponding structures of the protective mechanism 3.

Figure 10:
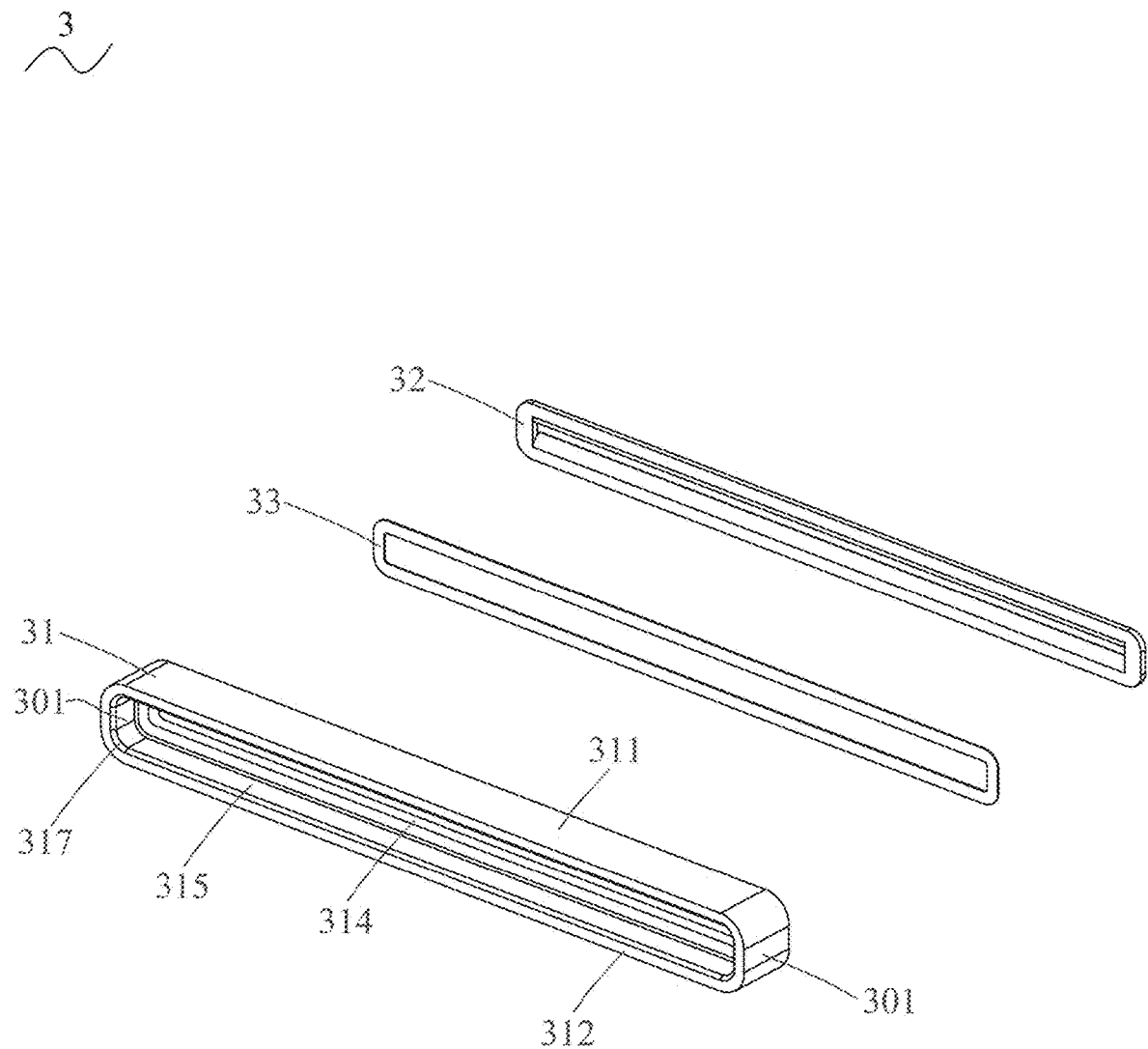
FIG. 10 is an exploded view of a protective mechanism of the card reader with the protective mechanism of FIG. 9.
Figure 11:
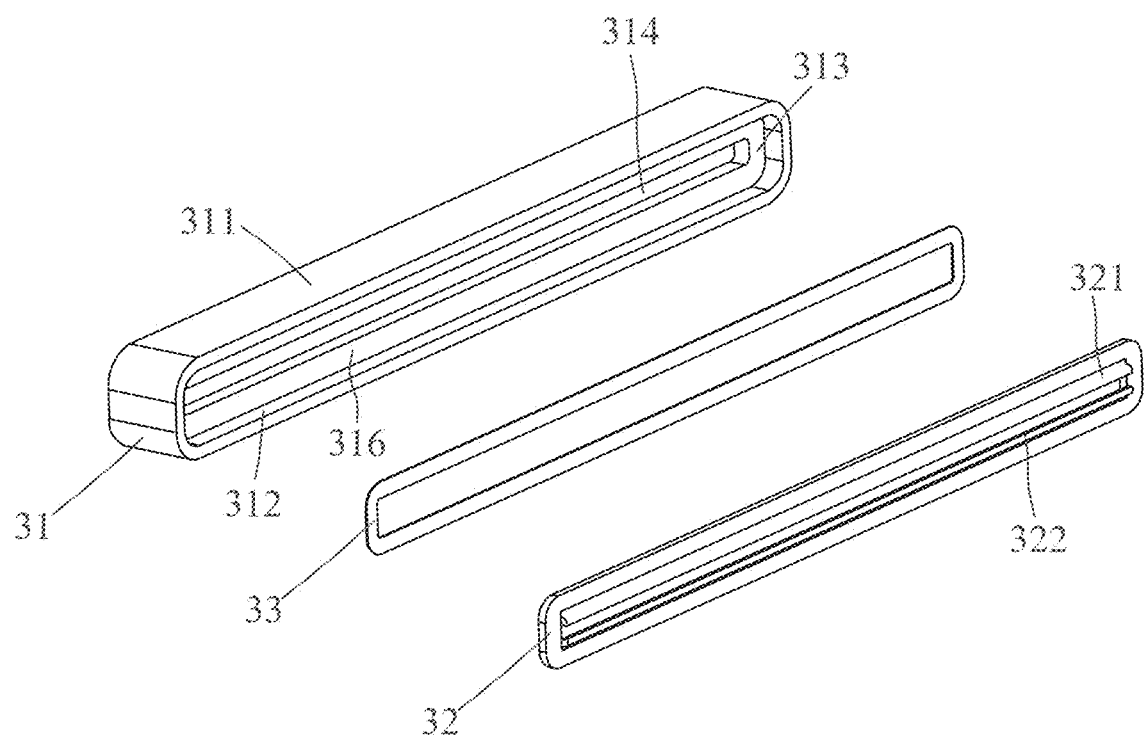
FIG. 11 is another exploded view of the protective mechanism of the card reader with the protective mechanism of FIG. 9.

Referring to FIG. 10 and FIG. 11, the protective mechanism 3 includes a protective shell 31 and a dustproof sheet 32. The dustproof sheet 32 is disposed in the protective shell 31. The protective shell 31 has a top wall 311, a bottom wall 312, two lateral walls 301, an isolating wall 313, an inserting slot 314, an inserting end 315 and an outlet end 316. The top wall 311 is opposite to the bottom wall 312. The two lateral walls 301 are disposed vertically, and the two lateral walls 301 are connected between two ends of the top wall 311 and two ends of the bottom wall 312. The isolating wall 313 is connected between two middles of two inner surfaces of the top wall 311 and the bottom wall 312. The inserting slot 314 penetrates through a middle of the isolating wall 313, a front surface and a rear surface of the protective shell 31 along a longitudinal direction. The inserting slot 314 transversely extends in the middle of the isolating wall 313.

A front end of the protective shell 31 defines the inserting end 315 penetrating through the front surface of the protective shell 31. The inserting end 315 is located among a front end of the top wall 311, a front end of the bottom wall 312, a front end of the isolating wall 313 and front ends of the two lateral walls 301. A rear end of the protective shell 31 defines the outlet end 316 penetrating through the rear surface of the protective shell 31. The outlet end 316 is located among a rear end of the top wall 311, a rear end of the bottom wall 312, a rear end of the isolating wall 313 and rear ends of the two lateral walls 301. The inserting end 315 and the outlet end 316 are isolated by the isolating wall 313. The inserting passageway 13 of the upper shell 1 is communicated with the inserting slot 314. The inserting end 315 is next to one end of the inserting passageway 13 of the upper shell 1. The outlet end 316 is close to one end of the circuit board assembly 4. The dustproof sheet 32 is disposed in the outlet end 316. In the preferred embodiment, the dustproof sheet 32 is adhered to the outlet end 316 by a back glue 33. The dustproof sheet 32 is adhered to a rear surface of the isolating wall 313 by the back glue 33. The dustproof sheet 32 has an upper dustproof sheet 321, and a lower dustproof sheet 322 located under the upper dustproof sheet 321. The upper dustproof sheet 321 and the lower dustproof sheet 322 are adhered to the rear surface of the isolating wall 313. In the concrete implementation, the dustproof sheet 32 is without being limited to be adhered to the rear surface of the isolating wall 313 by the back glue 33.

The rear ends of the upper extending portion 11 and the lower extending portion 12 of the upper shell 1 are inserted into the inserting end 315 of the protective shell 31. The upper extending portion 11 of the upper shell 1 abuts against an upper portion of an inner surface of the inserting end 315. The upper extending portion 11 of the upper shell 1 abuts against a front surface of the isolating wall 313 and the inner surface of the top wall 311. The lower extending portion 12 of the upper shell 1 abuts against a lower portion of the inner surface of the inserting end 315. The lower extending portion 12 of the upper shell 1 abuts against the front surface of the isolating wall 313 and the inner surface of the bottom wall 312.

In the preferred embodiment, the first supporting portion 23 of the lower shell 2 is used for locating and supporting the lower extending portion 12 of the upper shell 1. The bottom wall 312 is used for locating and supporting the lower extending portion 12 of the upper shell 1. Preferably, a top surface of the first supporting portion 23 of the lower shell 2 is flush with a top surface of the bottom wall 312. Rear ends of the upper extending portion 11 and the lower extending portion 12 of the upper shell 1 are surrounded by the protective shell 31. The inserting passageway 13 of the upper shell 1 is corresponding to the inserting slot 314. The inserting passageway 13 of the upper shell 1 is aligned with a middle of the inserting slot 314. The protective shell 31 prevents a position deviation of the inserting passageway 13 of the upper shell 1 and a position deviation of the inserting slot 314, so an insertion position deviation of the card 200 is prevented to prevent the card reader with the protective mechanism 100 from colliding with the card 200, and a usage life of the card reader with the protective mechanism 100 is without being affected.

An inner portion of the front end of the protective shell 31 slantwise extends inward and rearward to form a third chamfer 317. An inner portion of the front end of the top wall 311, an inner portion of the front end of the bottom wall 312, and two inner portions of two front ends of the two lateral walls 301 of the protective shell 31 slantwise extend inward and rearward to form the third chamfer 317. The third chamfer 317 of the protective shell 31 is corresponding to the first chamfer 14 and the second chamfer 15 of the upper shell 1. The third chamfer 317 of the protective shell 31 is matched with the first chamfer 14 and the second chamfer 15 of the upper shell 1, so the upper extending portion 11 and the lower extending portion 12 are guided into the inserting end 315 by the first chamfer 14, the second chamfer 15 and the third chamfer 317. The third chamfer 317 of the protective shell 31 prevents the protective shell 31 from colliding with the upper extending portion 11 and the lower extending portion 12 of the upper shell 1, so that a damage of the protective shell 31 and the upper extending portion 11 and the lower extending portion 12 of the upper shell 1 is prevented. When the dustproof sheet 32 contacts with the card 200 for a long time, the dustproof sheet 32 is deformed. The lower shell 2 is removable to replace the dustproof sheet 32 of the card reader with the protective mechanism 100 to conveniently maintain the card reader with the protective mechanism 100.

Referring to FIG. 6 to FIG. 11, when the card 200 is without being inserted into the card reader with the protective mechanism 100, the dustproof sheet 32 is covered in the outlet end 316. The dustproof sheet 32 is blocked behind the inserting slot 314 and the isolating wall 313. So dusts and liquids entered the inserting slot 314 and the inserting passageway 13 are blocked from invading the circuit board assembly 4 by the dustproof sheet 32. The upper dustproof sheet 321 and the lower dustproof sheet 322 are adhered to the rear surface of the isolating wall 313 by the back glue 33. A bottom end of the upper dustproof sheet 321 abuts against a top end of the lower dustproof sheet 322.

The circuit board assembly 4 has a clamping slot 41 penetrating through a front of a middle of the circuit board assembly 4. The clamping slot 41 is corresponding to the outlet end 316 of the protective mechanism 3 along the longitudinal direction. The clamping slot 41 is corresponding to the inserting passageway 13 of the upper shell 1, the inserting slot 314 of the protective mechanism 3, and a contact area between the upper dustproof sheet 321 and the lower dustproof sheet 322 along the longitudinal direction.

Referring to FIG. 1 to FIG. 12, when the card 200 is inserted into the inserting passageway 13 of the upper shell 1 and the inserting slot 314 of the card reader with the protective mechanism 100, the card 200 abuts against the contact area between the upper dustproof sheet 321 and the lower dustproof sheet 322, the bottom end of the upper dustproof sheet 321 abuts against a top surface of the card 200, and the top end of the lower dustproof sheet 322 abuts against a bottom surface of the card 200. Two upper portions of two inner surfaces of the two lateral walls 301 cover the two outer surfaces of the two sides of the upper extending portion 11. Two lower portions of the two inner surfaces of the two lateral walls 301 cover the two outer surfaces of the two sides of the lower extending portion 12. The upper dustproof sheet 321 and the lower dustproof sheet 322 are deformed towards the circuit board assembly 4. The upper dustproof sheet 321 is separated from the lower dustproof sheet 322 to form an insertion space 302 between the upper dustproof sheet 321 and the lower dustproof sheet 322. The clamping slot 41 is corresponding to the insertion space 302 along the longitudinal direction. The clamping slot 41 is communicated with the outlet end 316, the insertion space 302, the inserting slot 314 and the inserting passageway 13. The clamping slot 41 is in alignment with a middle of the outlet end 316, the insertion space 302, the middle of the inserting slot 314 and the inserting passageway 13 along the longitudinal direction.

When the card 200 is inserted into the card reader with the protective mechanism 100, the upper dustproof sheet 321 and the lower dustproof sheet 322 clean the dusts and the liquids of the card 200. In the preferred embodiment, the upper dustproof sheet 321 and the lower dustproof sheet 322 are made of a material which is flexibly deformed and automatically restored.

After the card 200 is inserted into the inserting passageway 13 of the upper shell 1 and the inserting slot 314 of the protective mechanism 3, the card 200 passes through the insertion space 302 between the upper dustproof sheet 321 and the lower dustproof sheet 322, and then the card 200 is inserted into the clamping slot 41 of the circuit board assembly 4. In the preferred embodiment, a height of the inserting slot 314 of the protective mechanism 3 is slightly higher than a height of the inserting passageway 13 of the upper shell 1, so the card 200 passes through the inserting passageway 13 of the upper shell 1 and the inserting slot 314 of the protective mechanism 3 successfully.

When the card 200 is pulled out from the circuit board assembly 4, the upper dustproof sheet 321 and the lower dustproof sheet 322 are deformed towards the inserting passageway 13 of the upper shell 1. When the card 200 is receded from the upper dustproof sheet 321 and the lower dustproof sheet 322 of the dustproof sheet 32, the upper dustproof sheet 321 and the lower dustproof sheet 322 are automatically rebounded to be restored to original positions, and the upper dustproof sheet 321 and the lower dustproof sheet 322 abut against each other.

As described above, the card reader with the protective mechanism 100 is conveniently maintained by removing the lower shell 2 to replace the dustproof sheet 32, the rear ends of the upper extending portion 11 and the lower extending portion 12 of the upper shell 1 are surrounded by the protective shell 31, the inserting passageway 13 of the upper shell 1 and the inserting slot 314 are fastened to the protective shell 31 to make the inserting passageway 13 and the inserting slot 314 have fastened positions, so the insertion position deviation of the card 200 is prevented to prevent the card reader with the protective mechanism 100 from colliding with the card 200. Furthermore, the protective mechanism 3 is disposed to the front end of the circuit board assembly 4 to make the circuit board assembly 4 be away from the insertion space 302 of the dustproof sheet 32 which is disposed in the protective shell 31, after the card 200 passes through the insertion space 302 of the dustproof sheet 32, the card 200 passes through a longer route to be inserted to the clamping slot 41 by the protective shell 31, and the protective shell 31 blocks the electronic component of the circuit board assembly 4 from contacting the card 200, consequently, the card 200 and the dustproof sheet 32 hardly collide with the electronic component to cause a damage of the card 200. In addition, the third chamfer 317 prevents the protective shell 31 colliding with the upper extending portion 11 and the lower extending portion 12 of the upper shell 1, and the upper dustproof sheet 321 and the lower dustproof sheet 322 clean the dusts or the liquids of the card 200. As a result, the card reader with the protective mechanism 100 is able to increase the usage life of the card reader with the protective mechanism 100, conveniently replace the protective mechanism 3 and prevent extraneous materials from invading into the card reader with the protective mechanism 100.

What is claimed is:

1. A card reader with a protective mechanism, comprising:
an upper shell, an upper portion of a front end of the upper shell slantwise extending downward and rearward, and then being bent rearward to form an upper extending portion, a lower portion of the front end of the upper shell extending rearward to form a lower extending portion, the upper extending portion being spaced from the lower extending portion to form an inserting passageway between the upper extending portion and the lower extending portion, an outer portion of a rear end of the upper extending portion slantwise extending inward and rearward to form a first chamfer, an outer portion of a rear end of the lower extending portion slantwise extending inward and rearward to form a second chamfer, a bottom of the upper shell being opened freely;
a lower shell mounted to a bottom surface of the upper shell to form an accommodating space between the upper shell and the lower shell;
a protective mechanism disposed between the upper shell and the lower shell, and the protective mechanism being accommodated in the accommodating space, the protective mechanism having a protective shell and a dustproof sheet, the dustproof sheet being disposed in the protective shell, the dustproof sheet having an upper dustproof sheet, and a lower dustproof sheet located under the upper dustproof sheet, the protective shell having a top wall, a bottom wall and an isolating wall, the top wall being opposite to the bottom wall, the isolating wall being connected between two middles of two inner surfaces of the top wall and the bottom wall, the protective shell having an inserting slot penetrating through a middle of the isolating wall, a front surface and a rear surface of the protective shell along a longitudinal direction, the inserting slot transversely extending in the middle of the isolating wall, the inserting passageway of the upper shell being communicated with the inserting slot, a front end of the protective shell defining an inserting end penetrating through the front surface of the protective shell, a rear end of the protective shell defining an outlet end penetrating through the rear surface of the protective shell, the dustproof sheet being disposed in the outlet end, the rear ends of the upper extending portion and the lower extending portion being inserted into the inserting end of the protective shell, the upper extending portion abutting against an upper portion of an inner surface of the inserting end, the upper extending portion abutting against a front surface of the isolating wall and the inner surface of the top wall, the lower extending portion abutting against a lower portion of the inner surface of the inserting end, the lower extending portion abutting against the front surface of the isolating wall and the inner surface of the bottom wall, an inner portion of the front end of the protective shell slantwise extending inward and rearward to form a third chamfer, the third chamfer of the protective shell being corresponding to the first chamfer and the second chamfer of the upper shell; and
a circuit board assembly disposed between the upper shell and the lower shell, and the circuit board assembly being accommodated in the accommodating space, the protective mechanism being disposed to a front end of the circuit board assembly, the circuit board assembly having a clamping slot penetrating through a front of a middle of the circuit board assembly, the clamping slot being corresponding to the outlet end of the protective mechanism along the longitudinal direction, the clamping slot being corresponding to the inserting passageway and the inserting slot along the longitudinal direction;
wherein when a card is inserted into the inserting passageway and the inserting slot, the card abuts against the upper dustproof sheet and the lower dustproof sheet, the upper dustproof sheet is separated from the lower dustproof sheet to form an insertion space between the upper dustproof sheet and the lower dustproof sheet, the clamping slot is corresponding to the insertion space along the longitudinal direction, the clamping slot is communicated with the outlet end, the insertion space, the inserting slot and the inserting passageway.

2. The card reader with the protective mechanism as claimed in claim 1, wherein when the card is without being inserted into the card reader with the protective mechanism, the dustproof sheet is covered in the outlet end, the dustproof sheet is blocked behind the inserting slot and the isolating wall, a bottom end of the upper dustproof sheet abuts against a top end of the lower dustproof sheet, the clamping slot is corresponding to the inserting passageway, the inserting slot, and a contact area between the upper dustproof sheet and the lower dustproof sheet.

3. The card reader with the protective mechanism as claimed in claim 1, wherein two sides of the upper extending portion is bent downward, and two sides of the lower extending portion is bent upward, the two sides of the upper extending portion are connected with the two sides of the lower extending portion, respectively, the protective shell has two lateral walls connected between two ends of the top wall and two ends of the bottom wall, two upper portions of two inner surfaces of the two lateral walls cover two outer surfaces of the two sides of the upper extending portion, two lower portions of the two inner surfaces of the two lateral walls cover two outer surfaces of the two sides of the lower extending portion.

4. The card reader with the protective mechanism as claimed in claim 1, wherein the lower shell has a base board, and a peripheral wall protruded upward from a periphery of the base board, a front end of a top surface of the base board of the lower shell extends upward to form a first supporting portion, a middle of the top surface of the base board of the lower shell extends upward to form a second supporting portion, the first supporting portion is disposed under the lower extending portion of the upper shell, the second supporting portion is disposed under the circuit board assembly.

5. The card reader with the protective mechanism as claimed in claim 4, wherein the lower shell has a first mounting portion, the first mounting portion is formed between a rear surface of the first supporting portion and a front surface of the second supporting portion, the second supporting portion is hollow to define a second mounting portion inside the second supporting portion, the protective mechanism is fastened in the first mounting portion, the circuit board assembly is disposed in the second mounting portion.

6. The card reader with the protective mechanism as claimed in claim 1, wherein a height of the inserting slot of the protective mechanism is slightly higher than a height of the inserting passageway of the upper shell.

7. The card reader with the protective mechanism as claimed in claim 1, wherein when the card is inserted into the inserting passageway and the inserting slot, the card abuts against the upper dustproof sheet and the lower dustproof sheet, the upper dustproof sheet is separated from the lower dustproof sheet to form the insertion space between the upper dustproof sheet and the lower dustproof sheet, the clamping slot is in alignment with a middle of the outlet end, the insertion space, a middle of the inserting slot and the inserting passageway along the longitudinal direction.

8. A card reader with a protective mechanism, comprising:
an upper shell, an upper portion of a front end of the upper shell slantwise extending rearward to form an upper extending portion, a lower portion of the front end of the upper shell extending rearward to form a lower extending portion, the upper extending portion being spaced from the lower extending portion to form an inserting passageway, a bottom of the upper shell being opened freely;
a lower shell mounted to a bottom surface of the upper shell to form an accommodating space between the upper shell and the lower shell;
a protective mechanism disposed between the upper shell and the lower shell, and the protective mechanism being accommodated in the accommodating space, the protective mechanism having a protective shell and a dustproof sheet, the dustproof sheet being disposed in the protective shell, the dustproof sheet having an upper dustproof sheet, and a lower dustproof sheet located under the upper dustproof sheet, the protective shell having a top wall, a bottom wall and an isolating wall, the top wall being opposite to the bottom wall, the isolating wall being connected between two middles of two inner surfaces of the top wall and the bottom wall, the protective shell having an inserting slot penetrating through the isolating wall, a front surface and a rear surface of the protective shell along a longitudinal direction, the inserting passageway of the upper shell being communicated with the inserting slot, a front end of the protective shell defining an inserting end penetrating through the front surface of the protective shell, a rear end of the protective shell defining an outlet end penetrating through the rear surface of the protective shell, the dustproof sheet being disposed in the outlet end, rear ends of the upper extending portion and the lower extending portion being inserted into the inserting end of the protective shell, the upper extending portion abutting against an upper portion of an inner surface of the inserting end, the lower extending portion abutting against a lower portion of the inner surface of the inserting end; and
a circuit board assembly being accommodated in the accommodating space, the protective mechanism being disposed to a front end of the circuit board assembly, the circuit board assembly having a clamping slot penetrating through a front of the circuit board assembly.

9. The card reader with the protective mechanism as claimed in claim 8, wherein the lower shell has a base board, and a peripheral wall protruded upward from a periphery of the base board, a front end of a top surface of the base board of the lower shell extends upward to form a first supporting portion, a middle of the top surface of the base board of the lower shell extends upward to form a second supporting portion, the first supporting portion is disposed under the lower extending portion of the upper shell, the circuit board assembly is mounted to the second supporting portion.

10. The card reader with the protective mechanism as claimed in claim 9, wherein the lower shell has a first mounting portion, the first mounting portion is formed between a rear surface of the first supporting portion and a front surface of the second supporting portion, the second supporting portion is hollow to define a second mounting portion inside the second supporting portion, the protective mechanism is fastened in the first mounting portion, the circuit board assembly is disposed in the second mounting portion.

11. The card reader with the protective mechanism as claimed in claim 8, wherein a bottom end of the upper dustproof sheet abuts against a top end of the lower dustproof sheet, the upper dustproof sheet and the lower dustproof sheet are adhered to a rear surface of the isolating wall.

12. The card reader with the protective mechanism as claimed in claim 8, wherein a height of the inserting slot of the protective mechanism is slightly higher than a height of the inserting passageway of the upper shell.

13. The card reader with the protective mechanism as claimed in claim 8, wherein an outer portion of the rear end of the upper extending portion slantwise extends inward and rearward to form a first chamfer, an outer portion of the rear end of the lower extending portion slantwise extends inward and rearward to form a second chamfer, an inner portion of the front end of the protective shell slantwise extends inward and rearward to form a third chamfer, the third chamfer of the protective shell is corresponding to the first chamfer and the second chamfer of the upper shell.

14. A card reader with a protective mechanism, comprising:
an upper shell, an upper portion of a front end of the upper shell slantwise extending rearward to form an upper extending portion, a lower portion of the front end of the upper shell extending rearward to form a lower extending portion, the upper extending portion being spaced from the lower extending portion to form an inserting passageway, a bottom of the upper shell being opened freely;
a lower shell mounted to a bottom surface of the upper shell to form an accommodating space between the upper shell and the lower shell, the lower shell having a base board, a top surface of the base board extending upward to form a first supporting portion and a second supporting portion positioned behind the first supporting portion, a first mounting portion being defined between the first supporting portion and the second supporting portion, the first supporting portion supporting the lower extending portion of the upper shell;
a protective mechanism being accommodated in the accommodating space, the protective mechanism having a protective shell and a dustproof sheet, the protective shell having a top wall, a bottom wall and an isolating wall, the isolating wall being connected between two middles of two inner surfaces of the top wall and the bottom wall, the protective shell having an inserting slot penetrating through the isolating wall, a front surface and a rear surface of the protective shell, the inserting passageway of the upper shell being communicated with the inserting slot, a front end of the protective shell defining an inserting end penetrating through the front surface of the protective shell, a rear end of the protective shell defining an outlet end penetrating through the rear surface of the protective shell, the rear ends of the upper extending portion and the lower extending portion being inserted into the inserting end of the protective shell, the upper extending portion abutting against a front surface of the isolating wall and the inner surface of the top wall, the lower extending portion abutting against the front surface of the isolating wall and the inner surface of the bottom wall; and a circuit board assembly being accommodated in the accommodating space, the protective mechanism being disposed to a front end of the circuit board assembly, the circuit board assembly having a clamping slot communicated with the outlet end of the protective shell;

wherein the protective shell is positioned in the first mounting portion, the circuit board assembly is mounted to the second supporting portion.

* * * * *